United States Patent
Kim et al.

(10) Patent No.: US 11,569,856 B2
(45) Date of Patent: Jan. 31, 2023

(54) METHOD AND APPARATUS FOR RECEIVING PERIODIC BAND-LIMITED SIGNAL

(71) Applicant: Electronics and Telecommunications Research Institute, Daejeon (KR)

(72) Inventors: Kyungwon Kim, Daejeon (KR); Heon KooK Kwon, Daejeon (KR); Myung-Don Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 17/543,063

(22) Filed: Dec. 6, 2021

(65) Prior Publication Data
US 2022/0182091 A1    Jun. 9, 2022

(30) Foreign Application Priority Data

Dec. 7, 2020 (KR) .................... 10-2020-0169872
Nov. 17, 2021 (KR) .................... 10-2021-0158648

(51) Int. Cl.
*H04B 1/16* (2006.01)
*H04B 1/12* (2006.01)

(52) U.S. Cl.
CPC .............. *H04B 1/16* (2013.01); *H04B 1/12* (2013.01)

(58) Field of Classification Search
CPC .................................. H04B 1/16; H04B 1/12
See application file for complete search history.

(56) References Cited

U.S. PATENT DOCUMENTS 5,574,754 A    11/1996   Kurihara et al.
6,313,778 B1 *  11/2001  Ignjatovic ............. H03M 1/207
                                                341/155
(Continued)

FOREIGN PATENT DOCUMENTS

WO    02/089312    11/2002

OTHER PUBLICATIONS

Christian Vogel et al., "The Impact of Combined Channel Mismatch Effects in Time-Interleaved ADCs", IEEE Transactions on Instrumentation and Measurement, Feb. 2005, pp. 415-427, vol. 54, No. 1.

(Continued)

*Primary Examiner* — Dac V Ha
(74) *Attorney, Agent, or Firm* — Kile Park Reed & Houtteman PLLC

(57) ABSTRACT

An operation method of a receiving device may comprise: receiving a periodic band-limited signal from a transmitting device; determining whether a carrier frequency of the periodic band-limited signal satisfies a constraint; converting the periodic band-limited signal into a digital high-frequency band signal by sampling the periodic band-limited signal at an extraction rate equal to or less than a Nyquist extraction rate when the carrier frequency satisfies the constraint; down-converting the digital high-frequency band signal into a digital baseband signal; rearranging samples of a plurality of periods of the digital baseband signal into one period; and generating a reconstructed signal by performing low-pass filtering with a bandwidth of the periodic band-limited signal on the digital baseband signal in which the samples are rearranged.

12 Claims, 11 Drawing Sheets

(56) References Cited

U.S. PATENT DOCUMENTS

| | | | |
|---|---|---|---|
| 6,459,743 | B1 | 10/2002 | Lipka |
| 7,474,712 | B1* | 1/2009 | Keating .............. H03M 1/1255 |
| | | | 375/324 |
| 8,457,579 | B2 | 6/2013 | Mishali et al. |
| 9,054,905 | B2 | 6/2015 | Sen et al. |
| 9,294,112 | B1 | 3/2016 | Devarajan et al. |
| 9,350,591 | B2 | 5/2016 | Sorrells et al. |
| 10,122,551 | B2 | 11/2018 | Morris et al. |
| 2006/0083293 | A1* | 4/2006 | Keegan ................... G01S 19/22 |
| | | | 375/148 |
| 2011/0194658 | A1 | 8/2011 | Han |
| 2012/0013965 | A1* | 1/2012 | Dean ..................... G06F 17/141 |
| | | | 359/239 |
| 2012/0039417 | A1 | 2/2012 | Kim et al. |
| 2013/0177107 | A1 | 7/2013 | Seo et al. |

OTHER PUBLICATIONS

Ryan J. Pirkl et al., "Optimal Sliding Correlator Channel Sounder Design", IEEE Transactions on Wireless Communications, Sep. 2008, pp. 3488-3497, vol. 7, No. 9.

Moshe Mishali et al., "From Theory to Practice: Sub-Nyquist Sampling of Sparse Wideband Analog Signals", IEEE Journal of Selected Topics in Signal Processing, Apr. 2010, pp. 375-391, vol. 4, No. 2.

* cited by examiner

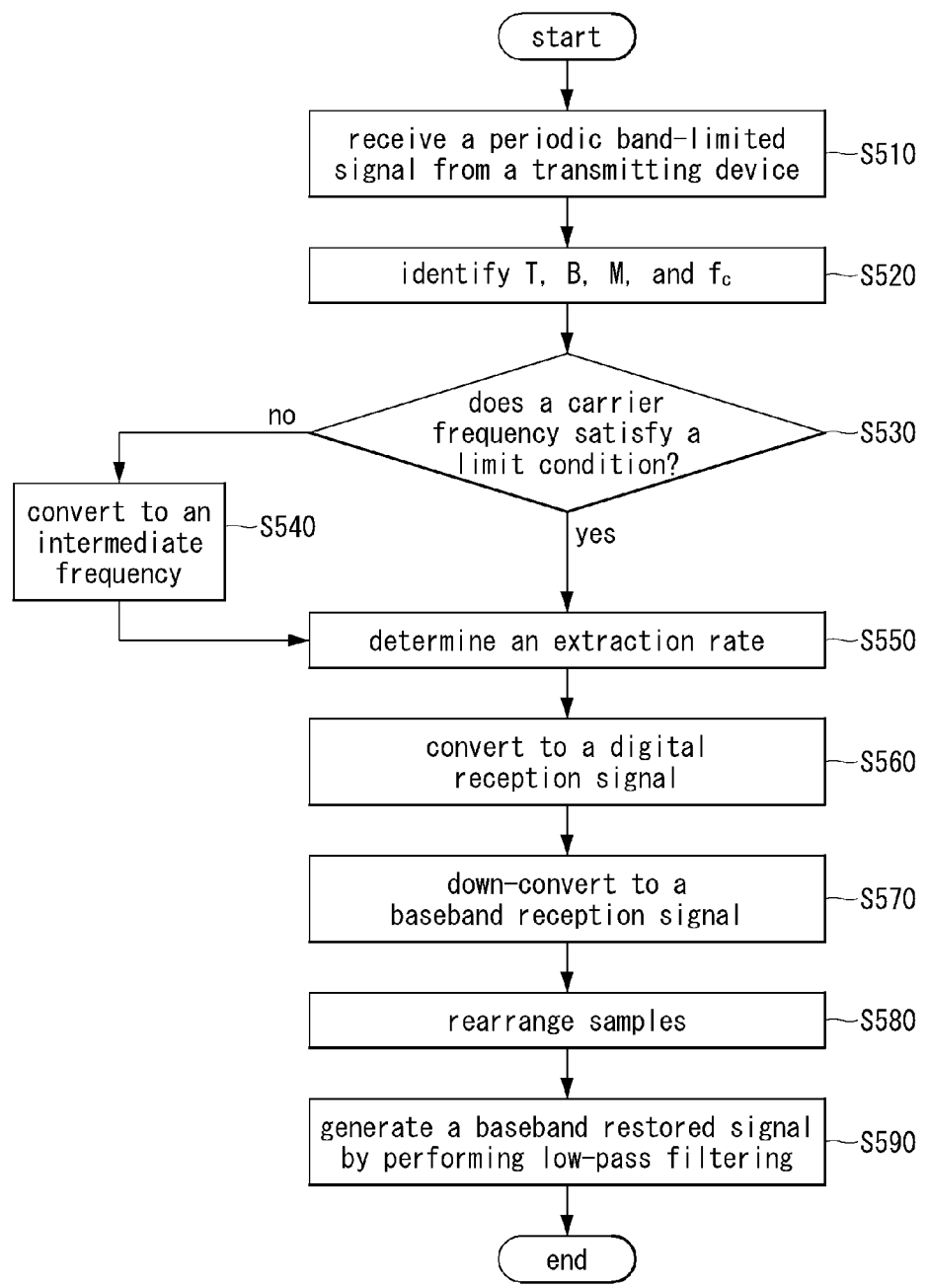

METHOD AND APPARATUS FOR RECEIVING PERIODIC BAND-LIMITED SIGNAL

CROSS-REFERENCE TO RELATED APPLICATIONS

This application claims priority to Korean Patent Applications No. 10-2020-0169872, filed on Dec. 7, 2020, and No. 10-2021-0158648 filed on Nov. 17, 2021 with the Korean Intellectual Property Office (KIPO), the entire contents of which are hereby incorporated by reference.

BACKGROUND

1. Technical Field

The present disclosure relates to a signal reception technique, and more particularly, to a signal reception technique for perfectly reconstructing a band-limited signal by extracting the band-limited signal at an extraction rate equal to or less than a Nyquist extraction rate.

2. Related Art

In order to process wireless data increasing rapidly, a communication system (e.g., new radio (NR) communication system) using a higher frequency band (e.g., frequency band of 6 GHz or above) than a frequency band (e.g., frequency band of 6 GHz or below) supported by a long-term evolution (LTE) or LTE-A communication system is being considered. The NR communication system may support a frequency band of 6 GHz or above as well as a frequency band of 6 GHz or below, and may support various communication services and scenarios compared to the LTE communication system. For example, the usage scenarios of the NR communication system may include enhanced Mobile BroadBand (eMBB), Ultra-Reliable Low-Latency Communication (URLLC), massive Machine Type Communication (mMTC), and the like.

Recently, in accordance with the high demand for wireless communication data, the development of communication technologies using a broadband frequency of an ultra-high frequency band is actively progressing. In particular, a terahertz (THz) band is a currently unexplored frequency, and may easily provide high-speed communication services by utilizing a bandwidth of gigahertz level. In order to develop a communication system in a terahertz band, research on radio wave propagation characteristics and radio channel characteristics of the terahertz band should be preceded. In order to study realistic channel characteristics, it may be necessary to collect radio channel characteristics using a wideband channel sounder at the same level as a frequency bandwidth to be used by the next-generation system. Among various sounders, a spread spectrum channel sounder may be a channel sounder capable of most accurately measuring a channel impulse response. When the spread spectrum channel sounder is implemented using a digital down conversion (DDC) technique, in-phase/quadrature (IQ) signals are simultaneously received, and thus more than twice a bandwidth may be required compared to a case of using an analog mixer to separately receive the IQ signals at baseband.

Since the maximum performance of the existing high-speed analog-digital converter (ADC) is about 10 giga samples per second (GSPS), it may be difficult to achieving the Nyquist extraction rate of DDC considering a gigahertz bandwidth and a guard band. In order to reduce the burden on the ADC, if signals are extracted in the baseband by using an analog mixer, a problem may occur in that the measurement accuracy is reduced due to an IQ imbalance, a timing skew, and the like.

SUMMARY

Accordingly, exemplary embodiments of the present disclosure are directed to providing a method and an apparatus for receiving a band-limited signal, which can perfectly reconstruct an original signal without information loss by extracting the band-limited signal at an extraction rate equal to or less than a Nyquist extraction rate and performing digital downlink conversion thereon.

According to a first exemplary embodiment of the present disclosure, an operation method of a receiving device in a communication system may comprise: receiving a periodic band-limited signal from a transmitting device; determining whether a carrier frequency of the periodic band-limited signal satisfies a constraint; converting the periodic band-limited signal into a digital high-frequency band signal by sampling the periodic band-limited signal at an extraction rate equal to or less than a Nyquist extraction rate when the carrier frequency satisfies the constraint; down-converting the digital high-frequency band signal into a digital baseband signal; rearranging samples of a plurality of periods of the digital baseband signal into one period; and generating a reconstructed signal by performing low-pass filtering with a bandwidth of the periodic band-limited signal on the digital baseband signal in which the samples are rearranged, wherein the constraint is that a complex signal of the digital baseband signal and a harmonic of a mirror complex signal thereof are orthogonal to each other.

The operation method may further comprise, when the carrier frequency does not satisfy the constraint, frequency-converting the periodic band-limited signal to have an intermediate frequency that satisfies the constraint.

The constraint may be given as an equation $$f_c = \frac{a + bK + cMK}{2KT},$$

wherein each of a, b and c may be an arbitrary integer, K may be a factor for determining a reception time, M may be a number of samples extracted during the reception time, T may be a periodicity of the periodic band-limited signal, and $f_c$ may be the carrier frequency, and K and M may be coprime.

The extraction rate equal to or less than the Nyquist extraction rate may be given as an equation $$f_s = \frac{M}{KT},$$

wherein $f_s$ may be the extraction rate, M may be a number of samples extracted during a reception time, K may be a factor for determining the reception time, and T may be a periodicity of the periodic band-limited signal.

The rearranging of the samples may comprise: converting the digital baseband signal into a continuous baseband reception signal; and rearranging the samples of the plurality of periods into the one period by time-shifting samples extracted from an i-th period of the continuous baseband reception signal by a time of (i×T), wherein i is an order of a sample period, and T is a periodicity of the periodic band-limited signal.

The generating of the reconstructed signal may comprise: converting the digital baseband signal in which the samples are rearranged into a frequency response signal; and generating the reconstructed signal from the frequency response signal by removing high-frequency signals outside a bandwidth of the periodic band-limited signal.

The generating of the reconstructed signal from the frequency response signal may comprise: removing the high-frequency signals outside the bandwidth of the periodic band-limited signal from the frequency response signal; generating a sampled reconstructed signal by applying an discrete inverse Fourier transform to the frequency response signal from which the high-frequency signals are removed; and generating a continuous reconstructed signal by applying a continuous-time inverse Fourier transform to the frequency response signal from which the high-frequency signals are removed.

According to a second exemplary embodiment of the present disclosure, a receiving device may comprise: a processor; a memory electronically communicating with the processor; and instructions stored in the memory, wherein when executed by the processor, the instructions cause the receiving device to: receive a periodic band-limited signal from a transmitting device; determine whether a carrier frequency of the periodic band-limited signal satisfies a constraint; convert the periodic band-limited signal into a digital high-frequency band signal by sampling the periodic band-limited signal at an extraction rate equal to or less than a Nyquist extraction rate when the carrier frequency satisfies the constraint; down-convert the digital high-frequency band signal into a digital baseband signal; rearrange samples of a plurality of periods of the digital baseband signal into one period; and generate a reconstructed signal by performing low-pass filtering with a bandwidth of the periodic band-limited signal on the digital baseband signal in which the samples are rearranged, wherein the constraint is that a complex signal of the digital baseband signal and a harmonic of a mirror complex signal thereof are orthogonal to each other.

The instructions may cause the receiving device to: when the carrier frequency does not satisfy the constraint, frequency-convert the periodic band-limited signal to have an intermediate frequency that satisfies the constraint.

In the rearranging of the samples, the instructions may cause the receiving device to: convert the digital baseband signal into a continuous baseband reception signal; and rearrange the samples of the plurality of periods into the one period by time-shifting samples extracted from an i-th period of the continuous baseband reception signal by a time of (i×T), wherein i is an order of a sample period, and T is a periodicity of the periodic band-limited signal.

In the generating of the reconstructed signal, the instructions may cause the receiving device to: convert the digital baseband signal in which the samples are rearranged into a frequency response signal; and generate the reconstructed signal from the frequency response signal by removing high-frequency signals outside a bandwidth of the periodic band-limited signal.

In the generating of the reconstructed signal from the frequency response signal, the instructions may cause the receiving device to: remove the high-frequency signals outside the bandwidth of the periodic band-limited signal from the frequency response signal; generate a sampled reconstructed signal by applying an discrete inverse Fourier transform to the frequency response signal from which the high-frequency signals are removed; and generate a continuous reconstructed signal by applying a continuous-time inverse Fourier transform to the frequency response signal from which the high-frequency signals are removed.

According to exemplary embodiments of the present disclosure, a receiving device may extract a periodic band-limited signal at an extraction rate equal to or less than the Nyquist extraction rate, and thus an original signal can be reconstructed without information loss through digital down-conversion. In addition, according to the exemplary embodiments of the present disclosure, it is made possible for the receiving device to perfectly reconstruct the original signal without information loss due to false signal aliasing with respect to the periodic band-limited signal. Further, according to the exemplary embodiments of the present disclosure, the receiving device can minimize use of analog circuits and utilize software, so that an implementation cost can be lowered. In addition, according to the exemplary embodiments of the present disclosure, since the receiving device can reconstruct a complex signal through real number sampling, the use of the analog mixer can be minimized, and errors such as IQ imbalance, timing skew, and nonlinearity can be prevented from occurring. Accordingly, the receiving device presented in the present disclosure can be used in an application field requiring precise signal measurement.

BRIEF DESCRIPTION OF DRAWINGS

FIG. 5 is a flowchart illustrating a first exemplary embodiment of a method for receiving a periodic band-limited signal.

DETAILED DESCRIPTION OF THE EMBODIMENTS

Figure 1:
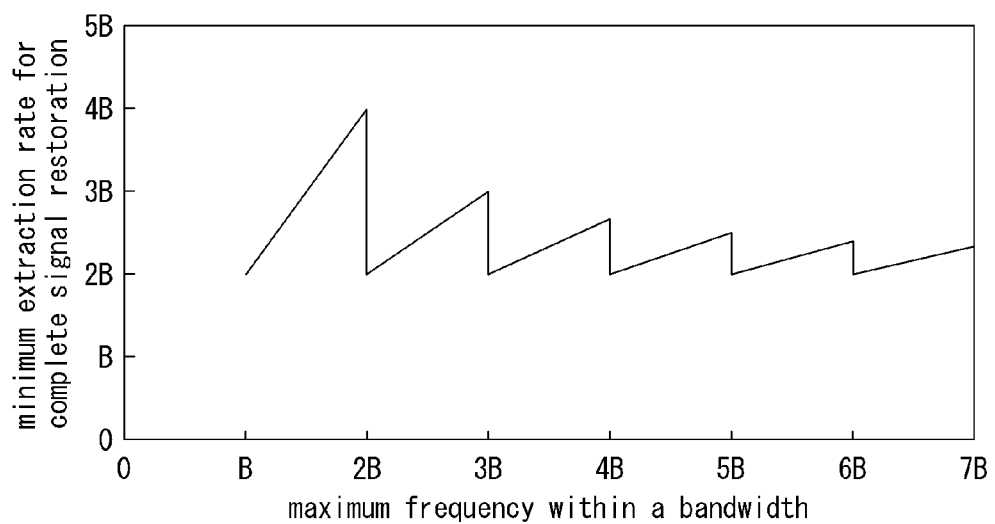
FIG. 1 is a graph showing a minimum extraction rate required according to a frequency band in band-pass sampling.

Embodiments of the present disclosure are disclosed herein. However, specific structural and functional details disclosed herein are merely representative for purposes of describing embodiments of the present disclosure. Thus, embodiments of the present disclosure may be embodied in many alternate forms and should not be construed as limited to embodiments of the present disclosure set forth herein.

Accordingly, while the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted.

Throughout the present disclosure, a 'network' may include, for example, a wireless Internet such as Wi-Fi, a portable Internet such as wireless broadband internet (WiBro) or world interoperability for microwave access (WiMax), a 3rd generation (3G) mobile communication network such as global system for mobile communication (GSM), code division multiple access (CDMA), or CDMA2000, a 3.5th generation (3.5G) mobile communication network such as high speed downlink packet access (HSDPA) or high speed uplink packet access (HSDPA), a 4th generation (4G) mobile communication network such as long term evolution (LTE) or LTE-Advanced, a 5th generation (5G) mobile communication network, and/or the like.

Throughout the present disclosure, a 'terminal' may refer to a mobile station, mobile terminal, subscriber station, portable subscriber station, user equipment, access terminal, and/or the like, and may include all or some functions of the terminal, mobile station, mobile terminal, subscriber station, portable subscriber station, user equipment, access terminal, and/or the like.

The terminal may refer to a desktop computer, laptop computer, tablet PC, wireless phone, mobile phone, smart phone, smart watch, smart glass, e-book reader, portable multimedia player (PMP), portable game console, navigation device, digital camera, digital multimedia broadcasting (DMB) player, digital audio recorder, digital audio player, digital picture recorder, digital picture player, digital video player, or the like that has communication capability and that a mobile communication service user can use.

Throughout the present disclosure, a 'base station' may refer to an access point, radio access station, NodeB, evolved NodeB, base transceiver station, mobile multi-hop relay-base station (MMR-BS), and/or the like, and may include all or some functions of the base station, access point, wireless access station, NodeB, evolved NodeB, base transceiver station, MMR-BS, and/or the like.

Meanwhile, as mobile traffic increases explosively due to various multimedia services, a faster wireless communication system may be required. Because current technologies are based on a limited bandwidth, a higher frequency band may attract attention due to the possibility of a wider bandwidth. The terahertz (THz) and sub-terahertz (sub-THz) frequency bands above 275 GHz have not yet been allocated to specific applications, and may be candidates for frequency bands for the next-generation communication services because they have several advantageous characteristics.

Since a terahertz signal has a short wavelength, it may have a high spatial resolution and a high directivity. In addition, although the terahertz signals have excellent permeability to dielectrics and non-polar liquids, they may be safe for a human body and may be rapidly attenuated in water. These characteristics can make the terahertz signals suitable for near field communications, wireless backhaul, fronthaul, radar, security inspection, biomedical sensing and imaging applications, and the like. In order to successfully develop and distribute communication services using the terahertz signals, it may be necessary to study the propagation and radio channel characteristics of the terahertz signals.

For this purpose, recently developed channel sounders may include a direct sequence spread spectrum (DSSS)-based channel sounder, an orthogonal frequency division multiplexing (OFDM)-based channel sounder, a chirp signal-based channel sounder, a sliding correlator, and a frequency vector network analyzer.

Here, the frequency vector network analyzer may be suitable for short-range measurement because a transmitter and a receiver should be connected with a cable. In addition, the sliding correlator and the chirp signal-based sounder, including the frequency vector network analyzer, may have a low mobility and a long measurement period, so they may be suitable for measurement on a channel that does not change with time. The OFDM-based channel sounder may generally have a lower signal-to-noise ratio (SNR) than the DSSS-based channel sounder. Accordingly, the DSSS technology may be an optimal solution for a channel sounder, which can provides a high SNR and high resolution of a channel impulse response.

Meanwhile, software-defined radio (SDR) technologies may be widely used due to development of a high-speed analog-digital converter (ADC) and demands for small, low-power, and lightweight terminals. The SDR technologies may be technologies that convert a radio frequency signal into a digital signal using a high-speed ADC so that functions of analog circuits may be performed in a digital stage. Among the SDR-based technologies, the digital down-conversion (DDC) technique does not suffer from radio frequency (RF) impairments such as a phase noise, IQ imbalances, timing skew offset, and nonlinearity.

Such the DDC technique may be used to simultaneously receive signals of several communication services because multi-band extraction is possible. Such the SDR-based technologies may reduce functions of analog circuits and may have low implementation costs because they can utilize software. However, it may be necessary to secure a wide bandwidth for the DSSS-based channel sounder using the DDC. Accordingly, the DSSS-based channel sounder using the DDC may require a high-speed ADC.

Meanwhile, a sub-sampling receiver may convert all high-frequency components into a digital signal in the first Nyquist region. In addition, the sub-sampling receiver may down-convert the digital signal into a baseband signal through digital signal processing. Thereafter, the sub-sampling receiver may extract data by reconstructing an original signal from the down-converted baseband signal. In this regard, the traditional sampling theory provides a requirement for a minimum sampling rate to avoid false signal aliasing, which is referred to as 'Nyquist sampling rate'. In lowpass sampling, the Nyquist sampling rate may be defined as twice the maximum frequency of a signal. According to the Nyquist extraction theory, in order for the receiver to reconstruct the signal without loss, it is required to secure an extraction rate of at least two times a bandwidth, and an extraction rate of a maximum of four times a bandwidth may be required depending on a frequency band. In general, when the extraction is performed at an extraction rate equal to or less than the Nyquist extraction rate, it may be known that a false signal aliasing phenomenon occurs and information is lost. In this regard, FIG. 1 may show a minimum extraction rate required according to a frequency band to reconstruct a signal without information loss due to a false signal aliasing phenomenon in band-pass sampling.

FIG. 1 is a graph showing a minimum extraction rate required according to a frequency band in band-pass sampling.

Referring to FIG. 1, a horizontal axis may indicate a maximum frequency within a bandwidth, and a vertical axis may indicate a minimum extraction rate for perfect signal reconstruction. Such the graph refers to a theory of band-pass sampling, and B may refer to a bandwidth of a signal. According to the band-pass sampling theory, a band-pass receiver, also referred to as a sub-sampling receiver, may directly receive and sample a carrier signal at a sampling frequency that is less than twice the maximum frequency.

In band-pass sampling, the Nyquist sampling rate may be defined as twice the signal bandwidth. In order to allow the band-pass receiver to overcome the Nyquist sampling rate, a time-interleaving technique may be proposed that uses several ADCs and buffers to convert an analog signal to a digital signal.

Figure 2:
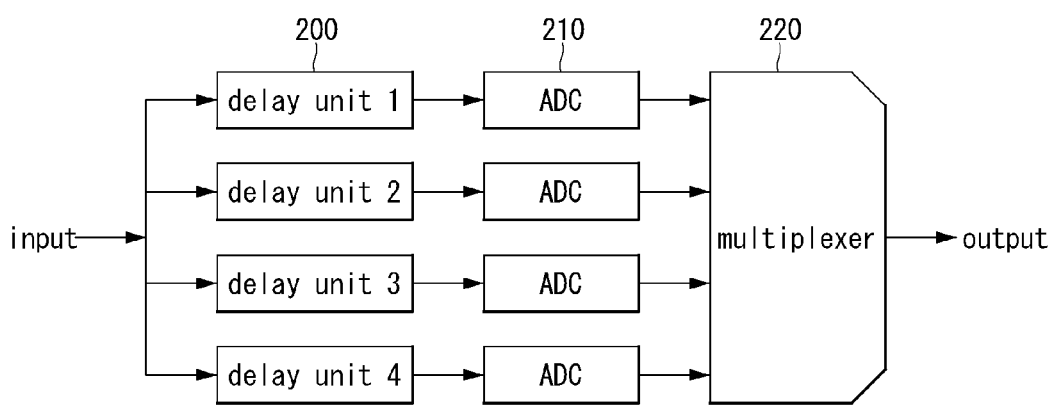
FIG. 2 is a block diagram illustrating a first exemplary embodiment of a time interleaving receiver.

FIG. 2 is a block diagram illustrating a first exemplary embodiment of a time interleaving receiver.

Referring to FIG. 2, in a time interleaving receiver, each of a plurality of ADCs 210 may be serially connected to each of a plurality of delay units 200 connected in parallel. Here, each of the delay units 200 may be configured as a buffer, and may delay an input signal and output the delayed input signal. In addition, each of the ADCs 210 may convert the signal delayed by each of the delay units 200 to a digital signal and output the converted signal. A multiplexer 220 may be connected to the plurality of ADCs 210 to multiplex and output the output signals of the plurality of ADCs 210. In such the time interleaving receiver, an error may occur due to a timing skew, and in particular, the higher a carrier frequency, the greater a phase error may be.

On the other hand, there may be a modulated wideband converter (MWC) as a means for allowing the band-pass receiver to overcome the Nyquist sampling rate. The MWC may generate a signal diversity by applying an arbitrary demodulation scheme to the false signal aliasing phenomenon, and may solve this through a linear equation. However, the MWC may not have a function to prevent the false signal aliasing in advance.

In addition, the sliding correlator (SC) that can be implemented using a low-speed ADC has been proposed to allow the band-pass receiver to overcome the Nyquist sampling rate. The sliding correlator may use two pseudo noise (PN) sequences having slightly different two chip rates, and a channel impulse response may be calculated by a convolution operation between the two slightly different PNs in the frequency domain. The convolution operation in the frequency domain may be implemented using an analog mixer, and since the channel impulse response is calculated by an analog mixer, the sliding correlator may be implemented using a low-speed ADC. However, since the sliding correlator requires too many PN iterations for the PN correlation, a frame period may be long and mobility may be reduced. However, since there is no high-speed ADC despite the low mobility, the sliding correlator may be adopted for a correlation-based channel sounder.

On the other hand, a compressed sensing (CS) theory may provide a possibility of perfectly reconstructing a signal compressible into a finite number of samples. In this regard, perfect reconstruction may mean that no information loss occurs due to false signal aliasing or insufficient number of samples. The compressed sensing theory may be a theory that, in case of a sparse signal, perfect reconstruction of the signal is possible even if the extraction rate is lower than the Nyquist extraction rate. A periodic band-limited signal may be a representative sparse signal. Various CS techniques may have been proposed. The CS technique may generate a signal diversity using a variety of schemes such as non-uniform sampling, kernel smoothing, random demodulation, multi-rate sampling, or time-varying sample rates. A receiver using the CS technique may use the signal diversity to estimate an original signal from an appropriate signal model. A reception method using such the CS technique may consist of two steps: a signal diversity generation step through an additional circuit configuration and an original signal estimation step.

In exemplary embodiments of the present disclosure, a circuit configuration may be simply implemented by replacing IQ sampling with real number sampling without additional circuit configuration for a periodic band-limited signal. The simplified circuit configuration may reduce an RF mismatch and increase measurement accuracy through digital signal conversion without errors. In order for a receiving device to perfectly reconstruct the signal, the number of reception samples may have to be greater than or equal to a degree of freedom of the signal based on the CS theory. In case of a periodic signal, since the same signal is continuously repeated, the degree of freedom may not increase over time even if one period passes. That is, the degree of freedom per unit time may gradually decrease according to an acquisition time when the periodic signal is received. The positions at which non-zero tones of a frequency response of a periodic signal are located based on the Fourier series are already known.

Therefore, in spite of a sub-Nyquist extraction rate, a false signal aliasing phenomenon can be prevented only when the receiving device selects an appropriate carrier frequency and sampling rate according to a signal period. It may take several periods for the receiving device to collect a sufficient number of samples, depending on the degree of freedom of the signal. The receiving device may reconstruct the original signal with simple digital processing and may not require techniques to generate a signal diversity.

Meanwhile, a periodic band-limited signal may be artificially generated mainly in a transmission system using a repetition code, or a naturally occurring periodic signal may be converted into the periodic band-limited signal by using a band-limiting filter. A spread spectrum channel sounder may generate a periodic band-limited signal by repeatedly transmitting a pseudo-noise code, and may collect a channel response within a limited bandwidth. The periodic band-limited signal may be used in various fields such as radar, signal detection/transmission/measurement, and bio-signal processing.

The receiving device proposed in the present disclosure may be able to perfectly reconstruct an original signal without information loss due to false signal aliasing with respect to a periodic band-limited signal. The receiving device proposed in the present disclosure may have a low implementation cost by minimizing functions of analog circuits, and may have no errors such as IQ imbalances and timing skews. Accordingly, the receiving device proposed in the present disclosure may be used in an application field requiring precise signal measurement.

Figure 3:
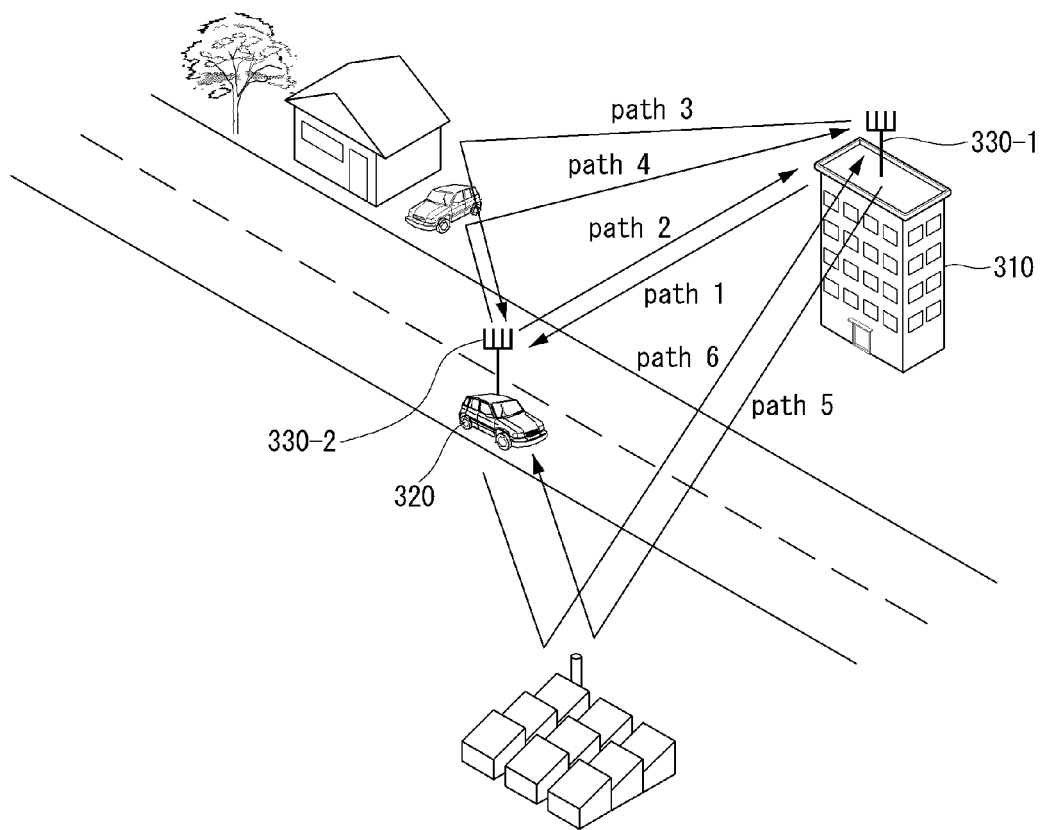
FIG. 3 is a conceptual diagram illustrating a first exemplary embodiment of a radio channel measurement system.

FIG. 3 is a conceptual diagram illustrating a first exemplary embodiment of a radio channel measurement system.

Referring to FIG. 3, a radio channel measurement system may include receiving devices 330-1 and 330-2, which are channel sounders respectively installed in a base station 310 and a mobile vehicle 320. The receiving device 330-1 installed in the base station 310 may measure a state of a radio channel by receiving a signal transmitted by the mobile vehicle 320 when the mobile vehicle 320 moves along a preset measurement path. In addition, the receiving device 330-2 installed in the mobile vehicle 320 may receive a signal transmitted from the base station 310 and measure a state of a radio channel when the mobile vehicle 320 moves along the preset measurement path. In this case, the paths of radio waves received by the receiving device 330-1 located in the base station 310 may be uplink paths (i.e., path 2, path 4, path 6). On the other hand, the paths of radio waves received by the receiving device 330-2 installed in the mobile vehicle 320 may be downlink paths (i.e., path 1, path 3, and path 5). The receiving devices 330-1 and 330-2 may accommodate not only the unidirectional measurement scheme that is a simplex measurement mode but also bidirectional measurement modes such as a time division duplex (TDD) mode and a frequency division duplex (FDD) mode, and a configuration of the device may be as shown in FIG. 4.

Here, the receiving device may be used as a channel sounder in the radio channel measurement system as shown in FIG. 3, but may not be limited thereto. The receiving device of the present disclosure may be applicable to all receiving systems (e.g., radar systems, signal detection systems, signal transmission systems, and bio-signal processing systems) that convert a periodic analog signal to a digital signal, in addition to such the channel sounder.

Figure 4:
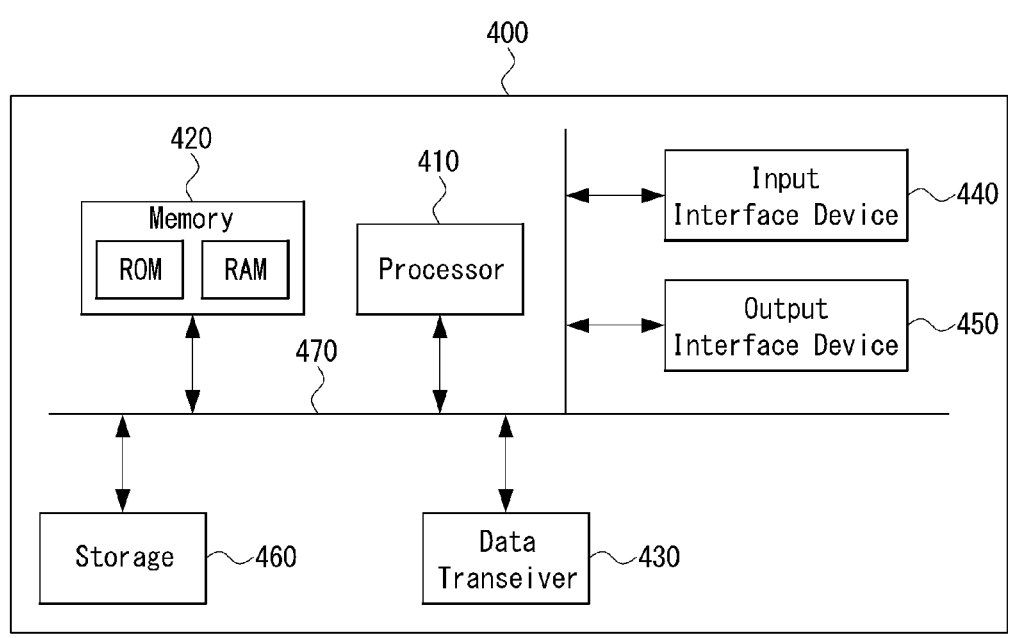
FIG. 4 is a block diagram illustrating a first exemplary embodiment of a receiving device constituting a radio channel measurement system.

FIG. 4 is a block diagram illustrating a first exemplary embodiment of a receiving device constituting a radio channel measurement system.

Referring to FIG. 4, a communication node 400 may comprise at least one processor 410, a memory 420, and a transceiver 430 connected to the network for performing communications. Also, the communication node 400 may further comprise an input interface device 440, an output interface device 450, a storage device 460, and the like. The respective components included in the communication node 400 may communicate with each other as connected through a bus 470. However, each component included in the communication node 400 may be connected to the processor 410 via an individual interface or a separate bus, rather than the common bus 470. For example, the processor 410 may be connected to at least one of the memory 420, the transceiver 430, the input interface device 440, the output interface device 450, and the storage device 460 via a dedicated interface.

The processor 410 may execute a program stored in at least one of the memory 420 and the storage device 460. The processor 410 may refer to a central processing unit (CPU), a graphics processing unit (GPU), or a dedicated processor on which methods in accordance with embodiments of the present disclosure are performed. Each of the memory 420 and the storage device 460 may be constituted by at least one of a volatile storage medium and a non-volatile storage medium. For example, the memory 420 may comprise at least one of read-only memory (ROM) and random access memory (RAM).

FIG. 5 is a flowchart illustrating a first exemplary embodiment of a method for receiving a periodic band-limited signal.

Referring to FIG. 5, a transmitting device may transmit a periodic band-limited signal having a periodicity T and a bandwidth B to a receiving device by using a carrier frequency $f_c$. Then, the receiving device may receive the periodic band-limited signal from the transmitting device through the carrier frequency $f_c$ during a reception time (S510). Here, the receiving device may know in advance the periodicity T and the bandwidth B of the periodic band-limited signal transmitted by the transmitting device. In addition, the receiving device may know in advance the carrier frequency $f_c$ used by the transmitting device to transmit the periodic band-limited signal. Thereafter, the receiving device may determine whether the carrier frequency $f_c$ used by the transmitting device satisfies a carrier frequency constraint (S520). Here, the reception time may be K times the periodicity T. Here, K may be an integer as a factor of determining the reception time (i.e., KT) during which the receiving device receives the band-limited signal from the transmitting device. For example, when K is 2, the receiving device may receive the signal for two periods.

Here, the carrier frequency constraint may be a constraint such that a complex reception signal and a harmonic of a mirror complex reception signal thereof are orthogonal when sampling a reception signal at an extraction rate equal to or less than the Nyquist extraction rate. Meanwhile, the carrier frequency constraint for making the complex reception signal orthogonal to the harmonic of the mirror complex reception signal thereof may be expressed by Equation 1 below.

$$f_c = \frac{a + bK + cMK}{2KT} \qquad \text{[Equation 1]}$$

Here, each of a, b and c may be an arbitrary integer greater than or equal to 0. M may be the number of samples that the receiving device extracts during the reception time (i.e., KT). K and M may be coprime. Here, M may be greater than or equal to 2×B×T. Accordingly, an extraction rate $f_s$ may be as shown in Equation 2 below.

$$f_s = \frac{M}{KT} \qquad \text{[Equation 2]}$$

Meanwhile, b may satisfy Equation 3 below.

$$N - g(a) \leq b \leq M - N - g(a) \qquad \text{[Equation 3]}$$

Here, N may be T×B. Also, g(a) may be expressed as shown in Equation 4 below.

$$g(a) = \frac{a - M \cdot f^{-1}(a)}{K} \qquad \text{[Equation 4]}$$

In Equation 4, a function $f(v)$ for calculating $f^{-1}(a)$ may be expressed as in Equation 5.

$$\alpha = f(v) = rem(v \cdot rem(M,K), K) \qquad \text{[Equation 5]}$$

Here, rem(x, y) may mean a remainder obtained by dividing x by y. In addition, v may be the smallest positive integer among i that makes (i×M)−a−(b×K) a multiple of K. Here, i may be the order of the sample period. Equations 1 and 3 may constitute the carrier frequency constraint for preventing false signal aliasing. The derivation process of Equations 1 and 3 and their necessity may be separately described below.

On the other hand, when it is assumed that the receiving device samples a reception signal received from the transmitting device by using an extraction rate equal to or greater than the Nyquist extraction rate and converts it to a baseband signal, the reception signal converted to the baseband (hereinafter referred to as a 'baseband reception signal x(t)') may be expressed as Equation 6 below, and a frequency response signal X(f) of the baseband reception signal may be expressed as Equation 7 below.

$$x(t) = \sum_{n=0}^{N-1} \alpha_n \cdot e^{\frac{j2\pi nt}{T}} \qquad \text{[Equation 6]}$$

$$X(f) = \sum_{n=0}^{N-1} \alpha_n \cdot \delta\left(f - \frac{n}{T}\right) \qquad \text{[Equation 7]}$$

Here, t may represent a time, and $f$ may represent a frequency. Here, N may be T×B. $\alpha_n$ may be a Fourier coefficient. $\delta(\cdot)$ may be a Dirac-delta function. As described above, the baseband reception signal obtained by converting the reception signal received by the receiving device from the transmitting device into the baseband may be different from the periodic band-limited signal transmitted by the transmitting device. This is because the periodic band-limited signal transmitted by the transmitting device may be distorted by being affected by obstacles or various factors while propagating in the air. The receiving device may identify a channel state or a radio state by receiving and analyzing the distorted periodic band-limited signal.

On the other hand, the signal received by the receiving device from the transmitting device may be a high-frequency band signal s(t) in which the baseband reception signal is modulated with the carrier frequency, and may be expressed as Equation 8 below.

$$s(t) = x_I(t) \cdot \cos(2\pi f_c t) - x_Q(t) \cdot \sin(2\pi f_c t) \qquad \text{[Equation 8]}$$

Here, $x_I(t)$ may be a real part of x(t), and $x_Q(t)$ may be an imaginary part of x(t). A frequency response signal s(f) of the high-frequency band signal may be expressed as in Equation 9 below. Here, X(f) may be a complex frequency response signal of the high-frequency band signal, and X*(f) may be a complex conjugate frequency response signal of the high-frequency band signal.

$$S(f) = \frac{X(f - f_c) + X^*(f - f_c)}{2} \qquad \text{[Equation 9]}$$

Meanwhile, a high-frequency band reception signal y(t) received by the receiving device from the transmitting device during the reception time (i.e., K×T) may be as shown in Equation 10. A frequency response signal Y(f) of the high-frequency band reception signal may be expressed as in Equation 11 below.

$$y(t) = s(t) \cdot rect\left(\frac{t}{KT}\right) \qquad \text{[Equation 10]}$$

$$Y(f) = S(f) \otimes KT \cdot \text{sinc}(KTf) = \tilde{X}(f - f_c) + \widetilde{X^*}(f - f_c) \qquad \text{[Equation 11]}$$

Here, $\tilde{X}(f)$ may be a complex frequency response signal of the high-frequency band reception signal (i.e., a complex reception signal of a high-frequency band), and may be expressed as in Equation 12 below. $\widetilde{X^*}(f)$ may be a complex conjugate frequency response signal of the high-frequency band reception signal (i.e., a complex conjugate reception signal of a high-frequency band), and may be expressed as in Equation 13 below.

$$\tilde{X}(f) = X(f) \otimes \frac{KT}{2} \cdot \text{sinc}(KTf) \qquad \text{[Equation 12]}$$

$$\widetilde{X^*}(f) = X^*(f) \otimes \frac{KT}{2} \cdot \text{sinc}(KTf) \qquad \text{[Equation 13]}$$

Here, rect(•) may be a rectangular function, and may be expressed as in Equation 14. sinc(•) may be a sync function, and may be expressed as in Equation 15. ⊗ may be a convolution operation symbol.

$$rect(x) = \begin{cases} 1, & -\frac{1}{2} \leq x < \frac{1}{2} \\ 0, & \text{oterwise} \end{cases} \qquad \text{[Equation 14]}$$

$$\text{sinc}(x) = \begin{cases} \dfrac{\sin \pi x}{\pi x}, & x < 0 \\ 1, & x \geq 0 \end{cases} \qquad \text{[Equation 15]}$$

Figure 6A:
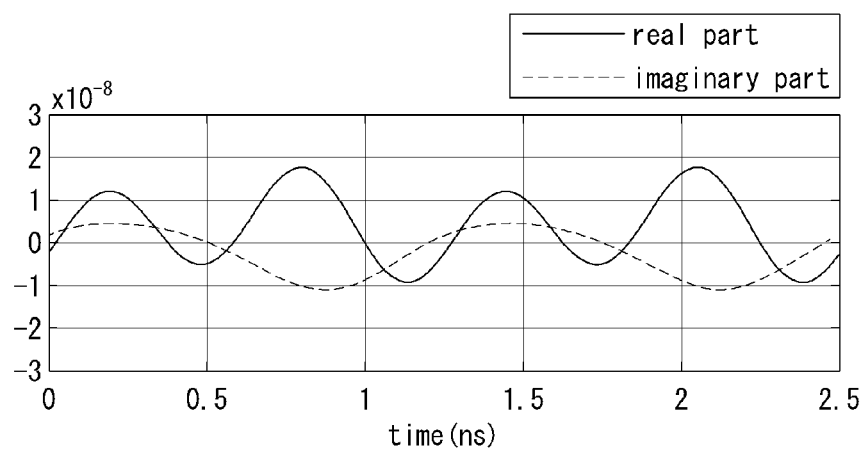
FIGS. 6A and 6B are graphs showing a first exemplary embodiment of a baseband reception signal.
Figure 6B:
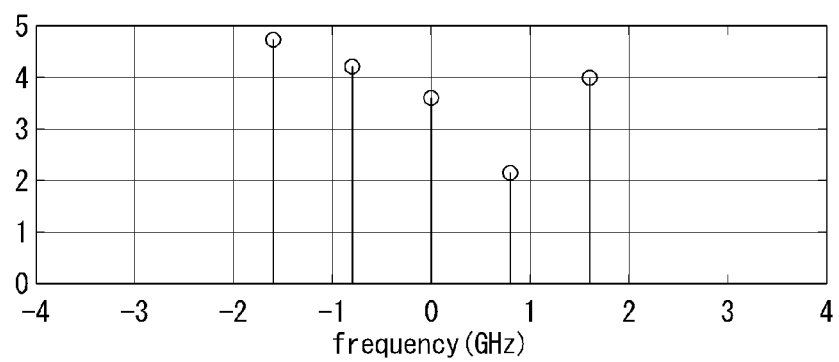

FIGS. 6A and 6B are graphs showing a first exemplary embodiment of a baseband reception signal.

Referring to FIG. 6A, a baseband reception signal may be composed of a real part indicated by a solid line and an imaginary part indicated by a dotted line in the time domain, and may be a periodic signal that is repeated at a predetermined periodicity. In addition, referring to FIG. 6B, the baseband reception signal may be a band-limited signal whose bandwidth is limited to 4 GHz in the frequency domain. Here, T may be 1.25 ns, B may be 4 GHz, N may be 5, M may be 15, K may be 2, and $f_c$ may be 3.2 GHz. Here, in order for the carrier frequency $f_c$ to be 3.2 GHz, a may be 0, b may be 8, and c may be 0.

Figure 7A:
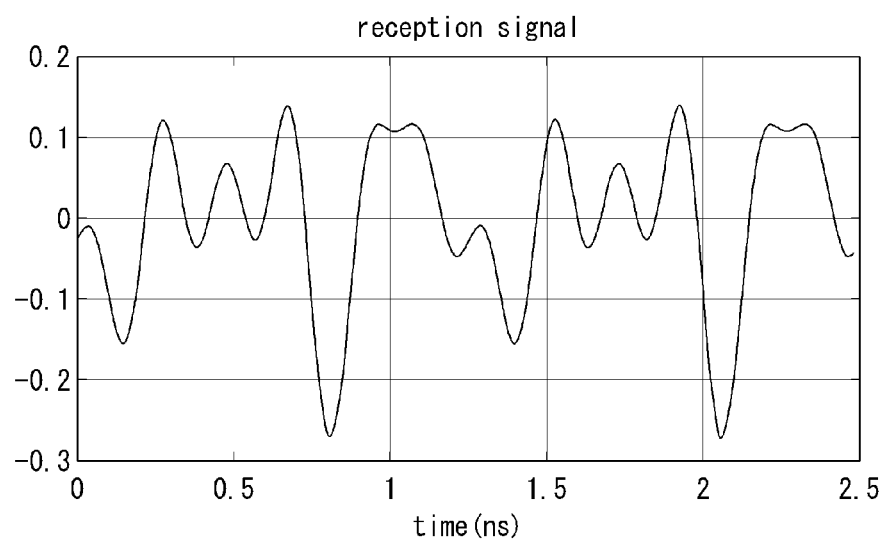
FIGS. 7A and 7B are graphs showing a first exemplary embodiment of a high-frequency band reception signal.
Figure 7B:
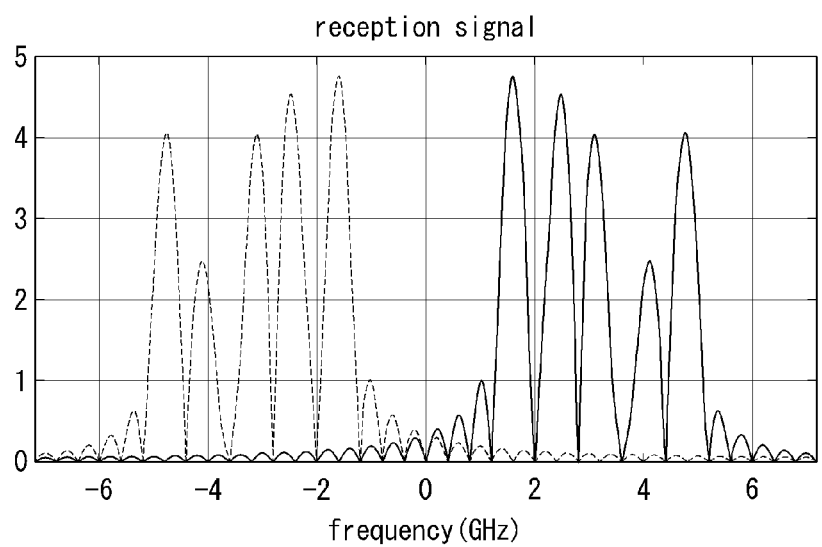

FIGS. 7A and 7B are graphs showing a first exemplary embodiment of a high-frequency band reception signal.

Referring to FIG. 7A, a high-frequency band reception signal may be indicated by a solid line in the time domain, and may be a periodic signal that is repeated at a predetermined periodicity. In addition, referring to FIG. 7B, a frequency response signal of the high-frequency band reception signal may be composed of a high-frequency band complex reception signal indicated by a solid line and a high-frequency band complex conjugate reception signal indicated by a dotted line in the frequency domain. Here, the high-frequency band complex conjugate reception signal may be an image reflecting the high-frequency band complex reception signal, which is generated in the process of digitally extracting the high-frequency band reception signal. Accordingly, the high-frequency band complex conjugate reception signal may be referred to as a high-frequency band complex mirror reception signal.

Referring again to FIG. 5, the receiving device may identify the periodicity T, the bandwidth B, the factor M for determining the reception time, and the carrier frequency $f_c$ with respect to the high-frequency band reception signal received from the transmitting device (S520). The periodicity T, the bandwidth B, and the carrier frequency $f_c$ may be previously stored by the receiving device in relation to the transmitting device, so that when the transmitting device for which a radio channel state is to be measured is determined, they may be easily identified from the stored information. In addition, the factor M for determining the reception time may be a factor configured and used by the receiving device to determine the reception time when receiving a signal from the transmitting device, so that the receiving device can easily identify the set factor for determining the reception time.

Then, the receiving device may determine whether the carrier frequency satisfies the carrier frequency constraint (S530). As a result of determining whether the carrier frequency satisfies the carrier frequency constraint, if the carrier frequency does not satisfy the carrier frequency constraint, the receiving device may frequency-convert the high-frequency band reception signal to a reception signal having an intermediate frequency that satisfies the carrier frequency constraint (S540).

On the other hand, as a result of determining whether the carrier frequency satisfies the carrier frequency constraint, if the carrier frequency satisfies the carrier frequency constraint, the receiving device may determine the extraction rate $f_s$ to reconstruct the baseband reception signal from the high-frequency band reception signal (S560).

Therefore, the receiving device may convert an analog high-frequency band reception signal into a digital high-frequency band reception signal by using the carrier frequency and the determined extraction rate (S560). When the receiving device converts the analog high-frequency band reception signal into the digital high-frequency band reception signal in the above-described manner, the high-frequency band reception signals may enter the first Nyquist zone. Here, the digital high-frequency band reception signal $y_s[m]$ may be expressed as in Equation 16, and a frequency response signal $Y_s[K]$ of the digital high-frequency band reception signal may be expressed as in Equation 17.

$$y_s[m] = y\left(m \cdot \frac{KT}{M}\right) \qquad \text{[Equation 16]}$$

$$Y_s[K] = \frac{M}{K} \sum_{i=-\infty}^{\infty} Y\left(\frac{k - iM}{KT}\right) \qquad \text{[Equation 17]}$$

Here, m may mean an order of a sample. Also, k may mean an order of a sample after performing discrete Fourier transform (DFT). Equation 17 may be expressed as Equation 18 by using Equation 11.

$$Y_s[K] = \frac{M}{K} \sum_{i=-\infty}^{\infty} Y\left(\frac{k - iM}{KT}\right) = \qquad \text{[Equation 18]}$$

$$\frac{M}{K} \sum_{i=-\infty}^{\infty} \tilde{X}\left(\frac{k - iM}{KT} - f_c\right) + \tilde{X}^*\left(\frac{k - iM}{KT} - f_c\right)$$

Here, $\tilde{X}(f)$ may be a complex frequency response signal of the digital high-frequency band reception signal. $\tilde{X}^*(f)$ may be a complex conjugate frequency response signal of the digital high-frequency band reception signal.

Meanwhile, in the complex frequency response signal of the digital high-frequency band reception signal, the same spectrum may be repeated at every frequency of an integer multiple of the extraction rate. As described above, the complex frequency response signal repeated at every frequency of an integer multiple of the extraction rate may be referred to as a harmonic. That such the harmonic interferes with the baseband complex reception signal may be referred to as a false signal interference phenomenon (i.e., false signal aliasing). Such the false signal aliasing may cause information loss.

Figure 8A:
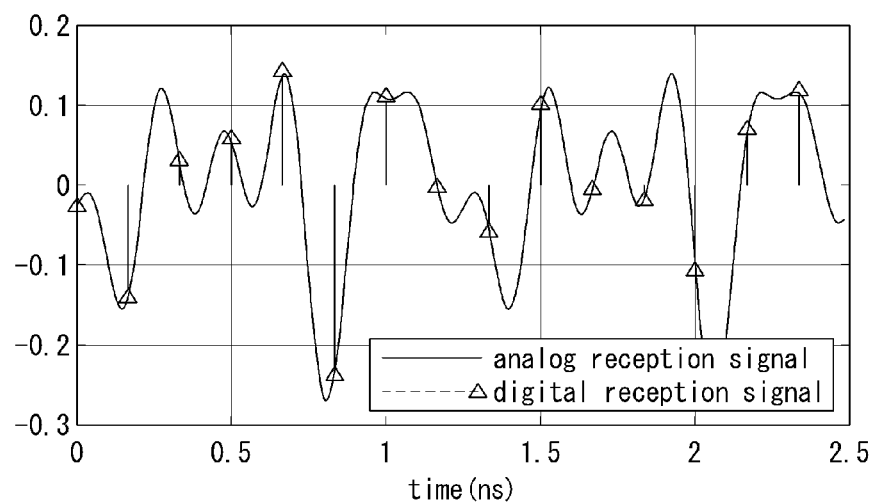
FIGS. 8A and 8B are conceptual diagrams for describing a process of converting an analog reception signal into a digital reception signal.
Figure 8B:
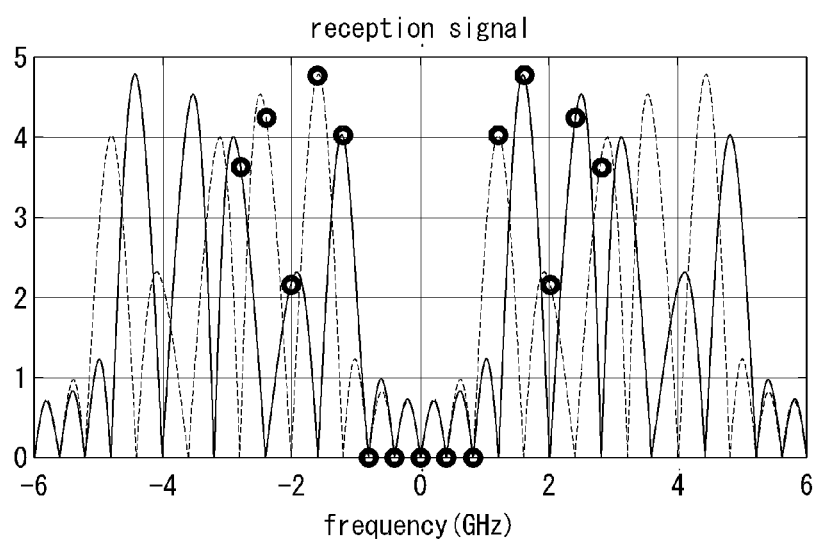

FIGS. 8A and 8B are conceptual diagrams for describing a process of converting an analog reception signal into a digital reception signal.

Referring to FIG. 8A, the receiving device may sample an analog high-frequency band reception signal by using the selected carrier frequency and the determined extraction rate (e.g., 6GSPS). In this case, a frequency response (indicated by circles) obtained by performing discrete Fourier transform on the digital high-frequency band reception signal and a frequency response signal (indicated by solid and dotted lines) obtained by performing continuous-time Fourier transform on the digital high-frequency band reception signal are shown in FIG. 8B.

Referring to FIG. 8B, a circle may be a result of performing discrete Fourier transform on the digital high-frequency band reception signal. In FIG. 8B, a box with a solid line may be the first Nyquist zone in a section having a frequency of 0 or above, and a box with a dotted line may be the first Nyquist zone in a section having a frequency of 0 or below. The discrete Fourier-transformed digital high-frequency band reception signals may be in the first Nyquist zone.

On the other hand, in the frequency response obtained by performing continuous-time Fourier transform on the digital high-frequency band reception signal, the same spectrum may be repeated at every frequency of an integer multiple of the extraction rate. In FIG. 8B, a solid line may indicate a complex frequency response signal of the digital high-frequency band reception signal, and a dotted line may indicate a complex conjugate frequency response signal of the digital high-frequency band reception signal. Here, the complex conjugate frequency response signal may be referred to as a mirror frequency response signal. In FIG. 8B, the frequency response signal existing in the section having a frequency of 0 or above may be a complex frequency response signal of the digital high-frequency band reception signal (simply, high-frequency band complex reception signal), which is represented by the solid line, and a harmonic of a complex conjugate frequency response signal of the digital high-frequency band reception signal (simply, high-frequency band mirror complex reception signal), which is represented by the dotted line. In addition, in FIG. 8B, the frequency response signal existing in the section having a frequency of 0 or below may be a harmonic of a complex frequency response signal of the digital high-frequency band reception signal, which is represented by a solid line, and a complex conjugate frequency response signal of the digital high-frequency band reception signal, which is represented by a dotted line.

Referring again to FIG. 5, the receiving device may down-convert the digital high-frequency band reception signal to a baseband reception signal by performing DDC on the digital high-frequency band reception signal (S570). Through this process, the baseband reception signal down-converted from the digital high-frequency band reception signal may be expressed as Equation 19. Also, a frequency response signal $Y_b[K]$ of the baseband reception signal down-converted from the digital high-frequency band reception signal may be expressed as Equation 20.

$$y_b[m] = y_s[k] \cdot e^{-j2\pi f_c \frac{m}{M}KT} \qquad \text{[Equation 19]}$$

$$Y_b[K] = \frac{M}{K} \sum_{i=-\infty}^{\infty} \tilde{X}\left(\frac{k-iM}{KT}\right) + \widetilde{X^*}\left(\frac{k-iM}{KT} - 2f_c\right) \qquad \text{[Equation 20]}$$

Here, $\tilde{X}(f)$ may be a complex frequency response signal of the digital down-converted baseband reception signal. $\widetilde{X^*}(f)$ may be a complex conjugate frequency response signal of the digital down-converted baseband reception signal.

Figure 9A:
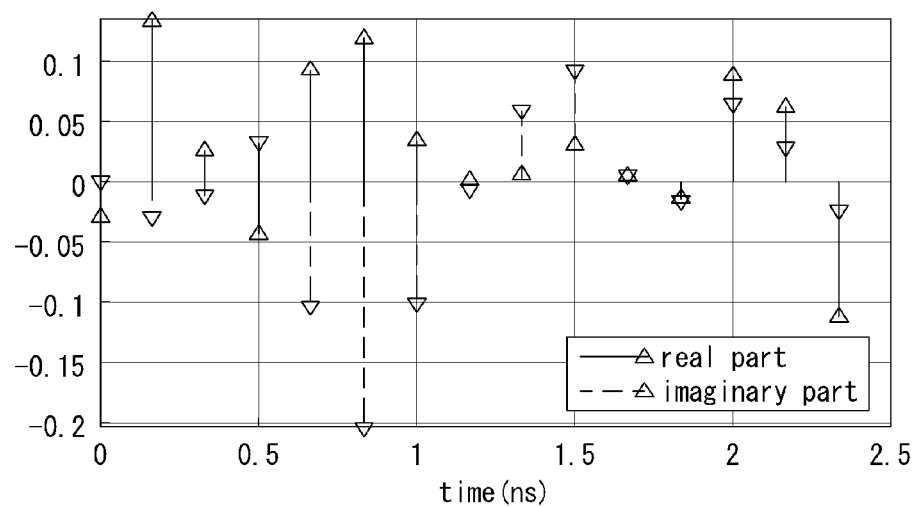
FIGS. 9A and 9B are conceptual diagrams for describing a baseband reception signal down-converted from a digital high-frequency band reception signal.
Figure 9B:
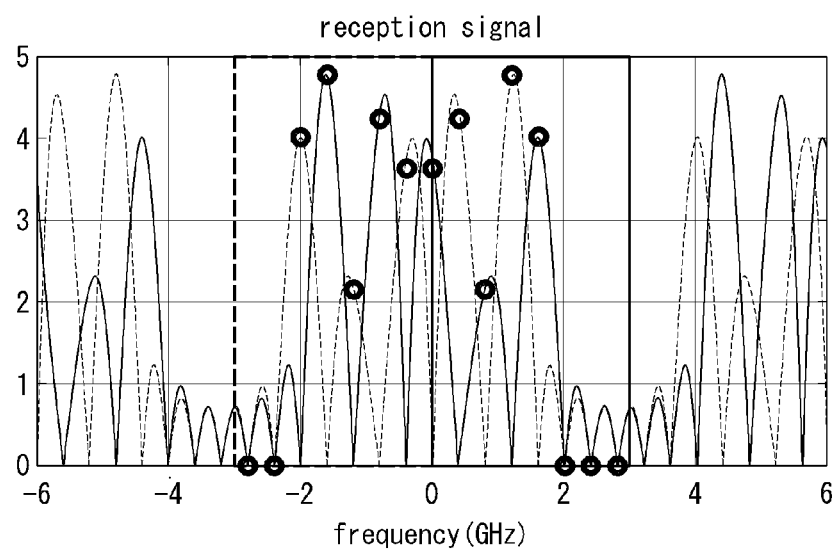

FIGS. 9A and 9B are conceptual diagrams for describing a baseband reception signal down-converted from a digital high-frequency band reception signal.

Referring to FIG. 9A, the reception device may down-convert the digital high-frequency band reception signal to the baseband reception signal by performing DDC on the digital high-frequency band reception signal. In this case, it can be seen that the down-converted baseband reception signal is a complex signal having a real part and an imaginary part. In this case, a frequency response of the down-converted baseband reception signal is shown in FIG. 9B.

Referring to FIG. 9B, a circle may be a result of performing on discrete Fourier transform on the down-converted baseband reception signal. In FIG. 9B, a box with a solid line may be the first Nyquist zone in a section having a frequency of 0 or above, and a box with a dotted line may be the first Nyquist zone in a section having a frequency of 0 or below. The discrete Fourier-transformed baseband reception signals may be in the first Nyquist zone.

On the other hand, in a frequency response obtained by performing continuous-time Fourier transform on the digital baseband reception signal, the same spectrum may be repeated at every frequency of an integer multiple of the extraction rate. In FIG. 9B, a solid line may indicate a complex frequency response signal of the digital baseband reception signal, and a dotted line may indicate a complex conjugate frequency response signal of the digital baseband reception signal. Here, the complex conjugate frequency response signal may be referred to as a mirror frequency response signal. In FIG. 9B, the frequency response signal existing in the section having a frequency of 0 or above may be a complex frequency response signal of the digital baseband reception signal (simply, baseband complex reception signal), which is represented by the solid line, and a harmonic of a complex conjugate frequency response signal of the baseband reception signal (simply, baseband mirror complex reception signal), which is represented by the dotted line. In addition, in FIG. 9B, the frequency response signal existing in the section having a frequency of 0 or below may be a harmonic of a complex frequency response signal of the digital baseband reception signal, which is represented by the solid line, and a complex conjugate frequency response signal of the digital baseband reception signal, which is represented by the dotted line. As described above, since the receiving device does not achieve the Nyquist extraction rate, bands of the harmonic of the complex conjugate reception signal and the complex reception signal may overlap each other in FIG. 9B.

Referring again to FIG. 5, the receiving device may perform a process of rearranging samples of the digital reception signal by time-shifting samples extracted in the i-th period by (i×T) (S580). To this end, the receiving device may convert the down-converted baseband digital reception signal into a continuous-time baseband reception signal by using a Dirac-delta function as shown in Equation 21. A frequency response $Y_c(f)$ of the continuous-time baseband reception signal may be expressed in Equation 22 below.

$$y_c(t) = y_b[m] \cdot \delta\left(t - m\frac{KT}{M}\right) \qquad \text{[Equation 21]}$$

$$Y_c(f) = Y_b[k] \cdot \delta\left(f - \frac{k}{KT}\right) \qquad \text{[Equation 22]}$$

The baseband reception signal $y_c(t)$ may be expressed by dividing it into signals of the respective periods, as shown in Equation 23 below.

$$y_c(t) = \sum_{i=0}^{K-1} y_i(t) \qquad \text{[Equation 23]}$$

Here, $y_i(t)$ may be the baseband reception signal of the i-th period. In this case, the receiving device may rearrange the baseband reception signals of all periods by time-shifting to the first period. In this case, the rearranged reception signal $z_c(t)$ may be expressed as in Equation 24, and a frequency response $Z_c(f)$ thereof may be expressed by Equation 25.

$$z_c(t) = \sum_{i=0}^{K-1} y_i(t) \cdot \delta(t+iT) \quad \text{[Equation 24]}$$

$$Z_c(f) = \sum_{i=0}^{K-1} Y_i(f) \cdot e^{j2\pi f iT} \quad \text{[Equation 25]}$$

Here, $Y_i(f)$ may be a frequency response of $y_i(t)$.

Figure 10A:
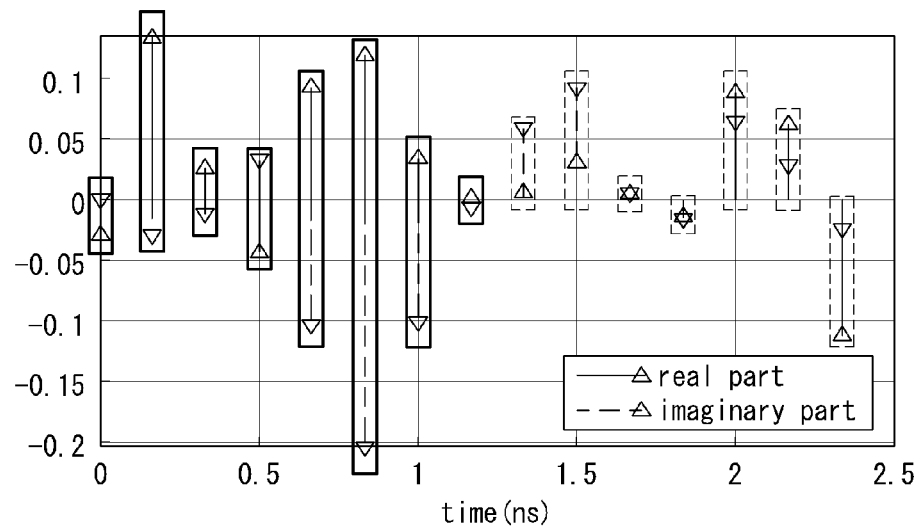
FIGS. 10A and 10B are conceptual diagrams for describing a process in which a receiving device rearranges samples of a digital reception signal.
Figure 10B:
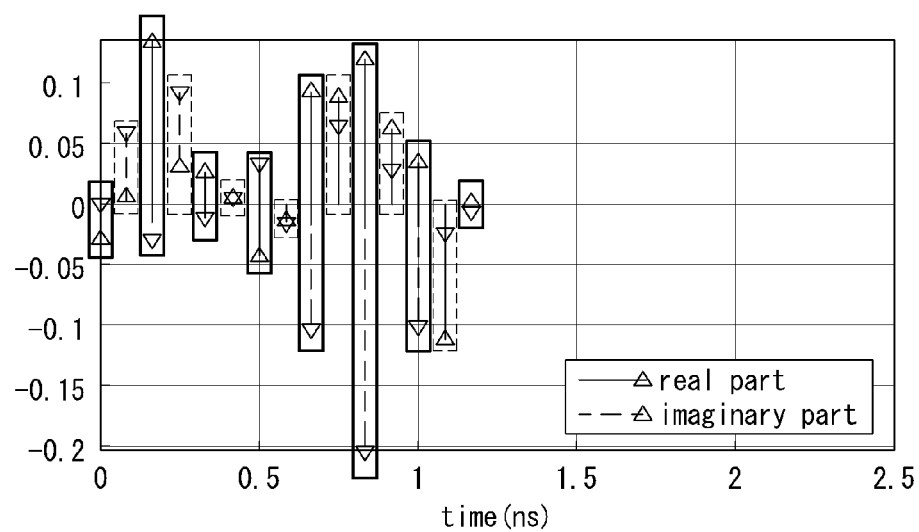

FIGS. 10A and 10B are conceptual diagrams for describing a process in which a receiving device rearranges samples of a digital reception signal.

FIG. 10A may be a graph showing a result of the receiving device converting the digital reception signal into a digital baseband reception signal. Signals indicated by solid line boxes in FIG. 10A may be samples extracted from the first period, and signals indicated by dotted line boxes may be samples extracted from the second period. FIG. 10B may be a graph showing a result of the receiving device rearranging samples of the digital reception signal. When the receiving device time-shifts the samples extracted from the i-th period by (i×T), all samples may be arranged within the first period. As such, the receiving device may have collected samples during the reception time, and all of the samples may be interpreted as samples of the signal of the first period. The reception signal rearranged by the receiving device may have a signal length of T, and an interval between samples may be T/M.

In this case, discrete Fourier transform may be performed on the digital baseband reception signal in which the samples are rearranged. In this case, the interval between frequency samples may be 1/T, and a range of the transformed frequency may be M/T. Accordingly, a frequency response Z[k] of the digital baseband reception signal in which the samples are rearranged may be derived from Equation 25 as in Equation 26 below.

$$Z[k] = \quad \text{[Equation 26]}$$

$$Z_c\!\left(\frac{k}{T}\right) = \sum_{i=0}^{K-1} Y_i\!\left(\frac{k}{T}\right) \cdot e^{j2\pi k i} = \sum_{i=0}^{K-1} Y_i\!\left(\frac{k}{T}\right) = Y_c\!\left(\frac{k}{T}\right) = Y_b[kK]$$

That is, the frequency response Z[k] of the baseband reception signal in which the samples are rearranged may be the same as a result of down-sampling the frequency response $Y_b[K]$ of the down-converted baseband reception signal by 1/K. Here, k/T may be f. This relationship may be explained by duality of time and frequency. In the process of sampling an analog signal to a digital signal, all high-frequency components may fall to the first Nyquist zone and overlap depending on an extraction rate. When interpreting this with the duality of time and frequency, the process of taking all signals of high-order periods as signals of the first period in the time domain may be the same as the sampling process in the frequency domain.

It may be necessary to understand the exact structure of the frequency response $Y_b[K]$ of the baseband reception signal in order to accurately extract a transmission signal through the arrangement of the digital baseband reception signal. sinc(KTf) may become a Dirac-delta function when extracted at a point where the frequency is an integer multiple of 1/(K×T). A result of a convolution operation on the Dirac-delta function and an arbitrary function may become the arbitrary function itself. Therefore, Equation 20 may be expressed as Equation 27.

$$Y_b[K] = \quad \text{[Equation 27]}$$

$$\frac{MT}{2}\left\{X\!\left(\frac{k}{KT}\right) + \sum_{i\neq 0} X\!\left(\frac{k-iM}{KT}\right) + \sum_{i=-\infty}^{\infty} \bar{X}^*\!\left(\frac{k-iM}{KT} - 2f_c\right)\right\}$$

Z[k] may be a result of discarding all components whose frequency is not 1/T from $Y_b[K]$. In Equation 27, $$X\!\left(\frac{k}{KT}\right)$$

may be a baseband reception signal to be extracted. Since all frequency components of the baseband reception signal are integer multiples of 1/T, the baseband reception signal may always exist at Z[k]. In Equation 27, $$\sum_{i\neq 0} X\!\left(\frac{k-iM}{KT}\right)$$

may be a harmonic of the baseband complex reception signal. The above-described constraint on the extraction rate may be a constraint that the harmonic of the baseband complex reception signal does not interfere with the baseband complex reception signal. Since K and M may be coprime=, the harmonic of the baseband complex reception signal may exist also at Z[k] even when i is a multiple of K. Since M is defined as an integer equal to or greater than 2N, the harmonic of the baseband complex reception signal cannot exist within the bandwidth of the baseband. In Equation 27, $$\sum_{i=-\infty}^{\infty} \bar{X}^*\!\left(\frac{k-iM}{KT} - 2f_c\right)$$

may be the harmonic of the baseband mirror complex reception signal. On the other hand, the baseband reception signal z[m] rearranged by the receiving device may be expressed as in Equation 28.

$$z[m_z] = y_b[m_y], \text{ where } m_z = rem(K \cdot m_y, M) \quad \text{[Equation 28]}$$

Referring again to FIG. 5, the receiving device may generate a baseband reconstructed signal by filtering the digital baseband reception signal in which the samples are rearranged using a lowpass filter having a bandwidth of the periodic band-limited signal (S590). If the harmonic of the complex conjugate reception signal of the baseband reception signal does not interfere with the complex reception signal of the baseband reception signal within the bandwidth of the baseband, the receiving device may accurately generate the baseband reception signal through the low-pass filter. That is, the baseband reconstructed signal may almost exactly match the baseband reception signal. As described above, a frequency response $Z_{LPF}[k]$ of the baseband reconstructed signal calculated by the receiving device through the low-pass filter may be expressed in Equation 29 below.

$$Z_{LPF}[k] = \begin{cases} \dfrac{2}{MT} \cdot Z[k], & -\dfrac{N}{2} \le k < \dfrac{N}{2} \\ 0, & \text{oterwise} \end{cases} \quad \text{[Equation 29]}$$

The process of the receiving device filtering the digital baseband reception signal in which the samples are rearranged using a low-pass filter having the bandwidth of the periodic band-limited signal may be performed by using software as a process of deleting the high-frequency components and performing the inverse Fourier transform. Here, the process of deleting the high-frequency components may be a process in which the receiving device deletes signals existing in frequencies other than the bandwidth of the periodic band-limited signal from the digital baseband reception signal in which the samples are rearranged. Also, the process of performing the inverse Fourier transform may include a process of generating the baseband reconstructed signal sampled in the time domain by performing discrete inverse Fourier transform on the digital baseband reception signal in which the samples from which the high-frequency components are removed are rearranged. In addition, the process of performing the inverse Fourier transform may include a process of generating a continuous baseband reconstructed signal in the time domain by performing inverse continuous-time Fourier transform on the digital baseband reception signal in which the samples from which the high-frequency components are removed are rearranged.

Figure 11:
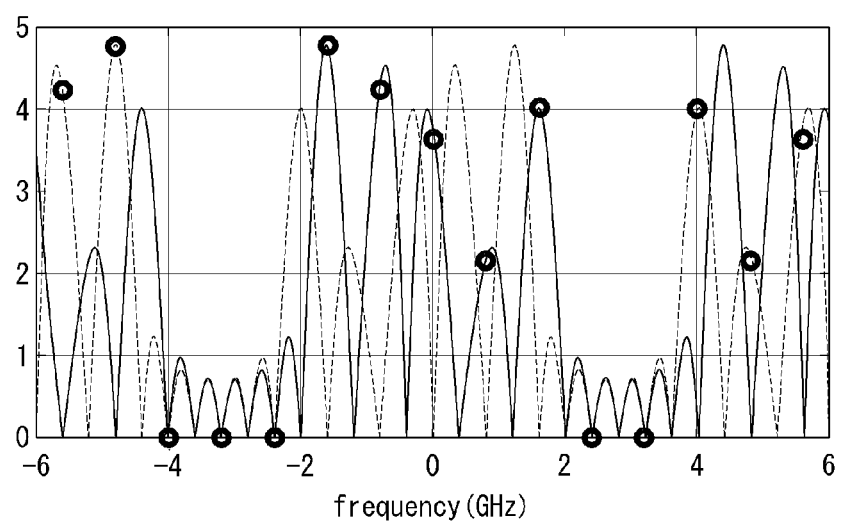
FIG. 11 may be a graph showing a frequency response signal of a digital reception signal in which samples are rearranged.

FIG. 11 may be a graph showing a frequency response signal of a digital reception signal in which samples are rearranged.

Referring to FIG. 11, a circle may be a result of performing discrete Fourier transform on the digital baseband reception signal in which samples are rearranged. On the other hand, in a frequency response obtained by performing continuous-time Fourier transform on the digital baseband reception signal in which the samples are rearranged, the same spectrum may be repeated at every frequency of an integer multiple of the extraction rate. In FIG. 11, a solid line may indicate a complex frequency response signal of the digital baseband reception signal in which the samples are rearranged, and a dotted line may indicate a complex conjugate frequency response signal for the digital baseband reception signal in which the samples are rearranged. Here, the complex conjugate frequency response signal may be referred to as a mirror frequency response signal. In FIG. 11, the frequency response signal existing in the section having a frequency of 0 or above may be a complex frequency response signal of the digital baseband reception signal in which the samples are rearranged (simply, baseband complex reception signal in which the samples are rearranged), which is represented by the solid line, and a harmonic of a complex conjugate frequency response signal of the digital baseband reception signal in which the samples are rearranged (simply, baseband mirror complex reception signal in which the samples are rearranged), which is represented by the dotted line. In addition, in FIG. 11, the frequency response signal existing in the section having a frequency of 0 or below may be a harmonic of a complex frequency response signal of the digital baseband reception signal in which the samples are rearranged, which is represented by the solid line, and a complex conjugate frequency response signal of the digital baseband reception signal in which the samples are rearranged, which is represented by the dotted line.

Figure 12A:
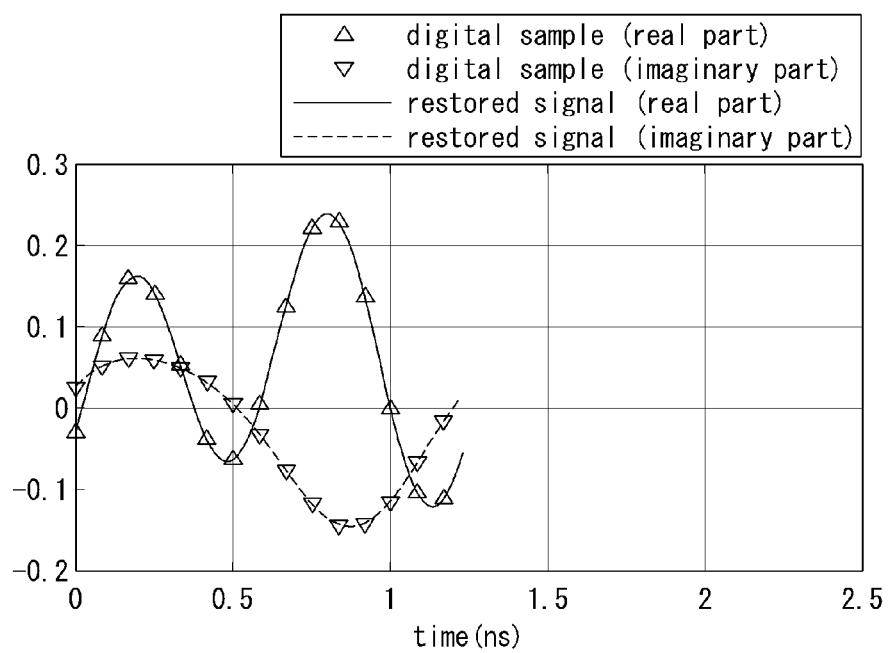
FIGS. 12A and 12B are graphs illustrating a baseband reconstructed signal.
Figure 12B:
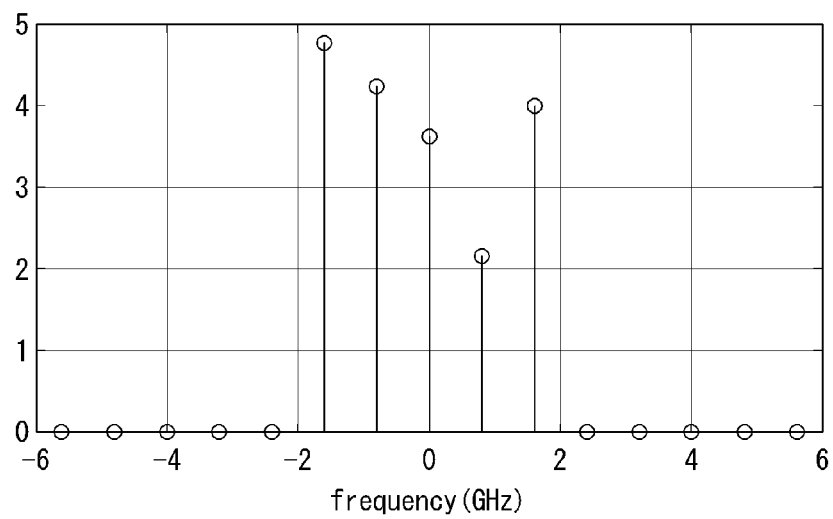

FIGS. 12A and 12B are graphs illustrating a baseband reconstructed signal.

Referring to FIG. 12A, the baseband reconstructed signal may be composed of a real part indicated by a solid line and an imaginary part indicated by a dotted line in the time domain, and may be a periodic signal that is repeated at a predetermined periodicity. In addition, the baseband reconstructed signal may be composed of a sampled real part indicated by an upward triangle and a sampled imaginary part indicated by a downward triangle in the time domain, and may be a periodic signal that is repeated at a predetermined periodicity. Further, referring to FIG. 12B, the baseband reception signal may be a band-limited signal whose bandwidth is limited to 4 GHz in the frequency domain. As described above, when the baseband reconstructed signal of FIG. 12A is compared with the baseband reception signal of FIG. 6A, it can be seen that the baseband reception signal is almost identically reconstructed in the time domain without information loss due to false signal aliasing. In addition, when the baseband reconstructed signal of FIG. 12B is compared with the baseband reception signal of FIG. 6B, it can be seen that the receiving device reconstructs the baseband reception signal almost identically in the frequency domain without information loss due to false signal aliasing.

Meanwhile, the carrier frequency constraint may be a constraint that the harmonic of the baseband complex mirror reception signal does not interfere with the baseband complex reception signal within the bandwidth of the baseband. In order for the harmonic of the baseband mirror complex reception signal to not interfere with the baseband complex reception signal, there may need to be no spectral leakage. When there is no spectral leakage, the sync function may be a Dirac-delta function, and the false signal may also have characteristics of a periodic band-limited signal. The carrier frequency constraint for no spectrum leakage may be as shown in Equation 30.

$$f_c = \frac{u}{2KT} \quad \text{[Equation 30]}$$

Here, u may be an integer greater than or equal to 0. When u is divided by K, if the quotient may be b and the remainder is a, a harmonic center frequency in a frequency response $Y_b[k]$ of the baseband reception signal may occur at $$-\frac{a+bK}{KT},$$

and may appear repeatedly at intervals of $$\frac{M}{KT}.$$

In this case, a center frequency of the i-th harmonic may be $$\frac{iM - a - bK}{KT}.$$

If (i×M)−a−(b×K) is a multiple of K, the i-th harmonic may appear also at z[k]. In this case, if v is the smallest positive integer among i that makes (i×M)−a−(b×K) a multiple of K, v may satisfy Equation 31 below.

$$a = f(v) \quad \text{[Equation 31]}$$

Equation 31 may be included in Equation 5. Then, when a is given, the zero-th center frequency of the harmonic for which (i×M)−a−(b×K) is a multiple of K may be $$\frac{f^{-1}(a)M - a - bK}{KT}.$$

Also, since K and M are coprime, the center frequency of the harmonic at which (i×M)−a−(b×K) is a multiple of K may be repeated every M×T like the baseband reception signal. That is, if the harmonic having a center of $$\frac{f^{-1}(a)M - a - bK}{KT}$$

do not overlap within the bandwidth of the baseband reception signal, the harmonic may not interfere with the baseband reception signal. In this case, Equation 32 and Equation 33 may have to be satisfied in order not to cause interference between the harmonic and the baseband reception signal. Equation 4 may be calculated using Equations 32 and 33.

$$\frac{f^{-1}(a)M - a - bK}{KT} \le -\frac{N}{T} \quad \text{[Equation 32]}$$

$$\frac{N}{T} \le \frac{f^{-1}(a)M - a - bK}{KT} + \frac{M}{T} \quad \text{[Equation 33]}$$

Meanwhile, the receiving device proposed in the present disclosure may have the following advantages compared to a receiver performing IQ demodulation in the baseband by using an analog mixer.

1) Since the receiving device according to the present disclosure minimizes analog circuits, the implementation cost may be low, and low power, light weight, and miniaturization may be possible.

2) Since the receiving device according to the present disclosure extracts signals from a radio frequency band rather than a baseband, an IQ demodulation process may not be required. Accordingly, the receiving device according to the present disclosure may not have problems such as IQ imbalance and timing skew.

3) Since the receiving device according to the present disclosure may perform selection of the carrier frequency and bandwidth by software rather than hardware, it may have high flexibility. That is, the receiving device according to the present disclosure may be applicable and extendable to various frequency bands and bandwidths with one piece of hardware.

4) The receiving device according to the present disclosure may be able to process a wideband periodic signal with a low-speed ADC, and may have no bandwidth constraint except for an infinite bandwidth.

Meanwhile, the exemplary embodiments of the present disclosure may have the following advantages compared to the time interleaving technique.

1) Since the receiving device according to the present disclosure does not use a large number of ADCs or buffers, the implementation cost may be low, and low power, light weight, and miniaturization may be possible.

2) Since the receiving device according to the present disclosure performs serial processing in one chain rather than parallel processing, there may be no phase error and no timing skew problem.

Meanwhile, the receiving device according to the present disclosure may have the following advantages when compared with compressed sensing schemes including MWC.

1) The receiving device according to the present disclosure may not have a pre-processing process for generating a signal diversity of non-uniform extraction and random modulation.

2) Since the receiving device according to the present disclosure does not solve complex linear equations and only uses sample rearrangement and a low-pass filter, calculation may be simplified.

3) The receiving device according to the present disclosure may prevent false signal aliasing with respect to a periodic signal in advance. Accordingly, the receiving device can guarantee perfect signal reconstruction without information loss due to false signal aliasing for all types of periodic signals under the ideal ADC assumption.

Meanwhile, the receiving device according to the present disclosure may have the following advantages compared to the SC scheme.

1) Since the receiving device according to the present disclosure may not use an analog mixer and use digital signal processing, it may be easy to implement a more flexible system.

2) Since the receiving device should know a code of the transmitting device in the SC scheme, the SC scheme cannot be applied to reconstruction of a general analog signal that is not modulated with a promised code. However, the receiving device according to the present disclosure can reconstruct signals without knowledge on a code of the transmitting device, and thus may be applied to reception of all types of periodic signals, and a range of application may be wide.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. An operation method of a receiving device in a communication system, the operation method comprising:
receiving a periodic band-limited signal from a transmitting device;
determining whether a carrier frequency of the periodic band-limited signal satisfies a constraint;
converting the periodic band-limited signal into a digital high-frequency band signal by sampling the periodic band-limited signal at an extraction rate equal to or less than a Nyquist extraction rate when the carrier frequency satisfies the constraint;

down-converting the digital high-frequency band signal into a digital baseband signal;

rearranging samples of a plurality of periods of the digital baseband signal into one period; and generating a reconstructed signal by performing low-pass filtering with a bandwidth of the periodic band-limited signal on the digital baseband signal in which the samples are rearranged, wherein the constraint is that a complex signal of the digital baseband signal and a harmonic of a mirror complex signal thereof are orthogonal to each other.

2. The operation method according to claim 1, further comprising, when the carrier frequency does not satisfy the constraint, frequency-converting the periodic band-limited signal to have an intermediate frequency that satisfies the constraint.

3. The operation method according to claim 1, wherein the constraint is given as an equation below $$f_c = \frac{a + bK + cMK}{2KT}$$

each of a, b and c is an arbitrary integer, K is a factor for determining a reception time, M is a number of samples extracted during the reception time, T is a periodicity of the periodic band-limited signal, and $f_c$ is the carrier frequency, and K and M are coprime.

4. The operation method according to claim 1, wherein the extraction rate equal to or less than the Nyquist extraction rate is given as an equation below $$f_s = \frac{M}{KT}$$

$f_s$ is the extraction rate, M is a number of samples extracted during a reception time, K is a factor for determining the reception time, and T is a periodicity of the periodic band-limited signal.

5. The operation method according to claim 1, wherein the rearranging of the samples comprises:

converting the digital baseband signal into a continuous baseband reception signal; and rearranging the samples of the plurality of periods into the one period by time-shifting samples extracted from an i-th period of the continuous baseband reception signal by a time of (i×T), wherein i is an order of a sample period and is an integer, and T is a periodicity of the periodic band-limited signal and is a real number.

6. The operation method according to claim 1, wherein the generating of the reconstructed signal comprises:

converting the digital baseband signal in which the samples are rearranged into a frequency response signal; and generating the reconstructed signal from the frequency response signal by removing high-frequency signals outside a bandwidth of the periodic band-limited signal.

7. The operation method according to claim 6, wherein the generating of the reconstructed signal from the frequency response signal comprises:

removing the high-frequency signals outside the bandwidth of the periodic band-limited signal from the frequency response signal;

generating a sampled reconstructed signal by applying an discrete inverse Fourier transform to the frequency response signal from which the high-frequency signals are removed; and generating a continuous reconstructed signal by applying a continuous-time inverse Fourier transform to the frequency response signal from which the high-frequency signals are removed.

8. A receiving device comprising:

a processor;

a memory electronically communicating with the processor; and instructions stored in the memory, wherein when executed by the processor, the instructions cause the receiving device to:

receive a periodic band-limited signal from a transmitting device;

determine whether a carrier frequency of the periodic band-limited signal satisfies a constraint;

convert the periodic band-limited signal into a digital high-frequency band signal by sampling the periodic band-limited signal at an extraction rate equal to or less than a Nyquist extraction rate when the carrier frequency satisfies the constraint;

down-convert the digital high-frequency band signal into a digital baseband signal;

rearrange samples of a plurality of periods of the digital baseband signal into one period; and generate a reconstructed signal by performing low-pass filtering with a bandwidth of the periodic band-limited signal on the digital baseband signal in which the samples are rearranged, wherein the constraint is that a complex signal of the digital baseband signal and a harmonic of a mirror complex signal thereof are orthogonal to each other.

9. The receiving device according to claim 8, wherein the instructions cause the receiving device to: when the carrier frequency does not satisfy the constraint, frequency-convert the periodic band-limited signal to have an intermediate frequency that satisfies the constraint.

10. The receiving device according to claim 8, wherein in the rearranging of the samples, the instructions cause the receiving device to:

convert the digital baseband signal into a continuous baseband reception signal; and rearrange the samples of the plurality of periods into the one period by time-shifting samples extracted from an i-th period of the continuous baseband reception signal by a time of (i×T), wherein i is an order of a sample period and is an integer, and T is a periodicity of the periodic band-limited signal and is a real number.

11. The receiving device according to claim 8, wherein in the generating of the reconstructed signal, the instructions cause the receiving device to:

convert the digital baseband signal in which the samples are rearranged into a frequency response signal; and generate the reconstructed signal from the frequency response signal by removing high-frequency signals outside a bandwidth of the periodic band-limited signal.

12. The receiving device according to claim 11, wherein in the generating of the reconstructed signal from the frequency response signal, the instructions cause the receiving device to:

remove the high-frequency signals outside the bandwidth of the periodic band-limited signal from the frequency response signal;
generate a sampled reconstructed signal by applying an discrete inverse Fourier transform to the frequency response signal from which the high-frequency signals are removed; and
generate a continuous reconstructed signal by applying a continuous-time inverse Fourier transform to the frequency response signal from which the high-frequency signals are removed.

* * * * *